United States Patent [19]
Marsberg

[11] 3,844,447
[45] Oct. 29, 1974

[54] VENDING MACHINES
[75] Inventor: Stanley G. Marsberg, Johannesburg, South Africa
[73] Assignee: Servomat Fast Foods Proprietary Limited, Johannesburg, South Africa
[22] Filed: Aug. 9, 1972
[21] Appl. No.: 279,065

[30] Foreign Application Priority Data
Aug. 17, 1971 South Africa...................... 71/5504
Apr. 13, 1972 South Africa...................... 72/2487
Apr. 13, 1972 South Africa...................... 72/2488
Apr. 13, 1972 South Africa...................... 72/2489

[52] U.S. Cl............................... 222/129.4, 222/416
[51] Int. Cl............................................. B67d 5/56
[58] Field of Search............. 222/129.4, 132, 144.5, 222/416, 129.3, 204, 236, 235, 228, 146, 2; 95/289, 283, 281, 282; 137/130, 142, 146, 148, 140, 149, 150.5; 99/300, 287; 259/4, 18

[56] References Cited
UNITED STATES PATENTS
2,517,073  8/1950  Alvarez................................. 99/289
2,802,599  8/1957  Callahan et al.............. 222/129.4 X
2,824,585  2/1958  Andres.............................. 222/2 X
2,843,293  7/1958  Burgoyne....................... 222/129.4
2,907,266  10/1959 Moulden.............................. 99/289
3,587,938  6/1971  Brown............................... 222/228

Primary Examiner—James B. Marbert
Assistant Examiner—James M. Slattery
Attorney, Agent, or Firm—Stevens, Davis, Miller & Mosher

[57] ABSTRACT

The invention is concerned with beverage dispensers for use in vending machines for brewed hot beverages such as tea or coffee. The beverage dispenser comprises an open container having a closed base and a controlled outlet from said base. At least one jet is located to discharge into the container to cause a circulatory movement in the container of liquid passed through the jet.

8 Claims, 9 Drawing Figures

VENDING MACHINES

This invention relates to vending machines for brewed hot beverages such as tea or coffee.

Generally known beverage dispensers for vending machines of the above kind operate on a system whereby boiling water is passed through a predetermined amount of tea leaves or coffee grounds. This is usually effected under pressure or gravity and is found not to be as efficient either in the use of the ingredients or in the quality of the beverage produced as is desired.

In presently used dispensers beverage ingredients of the above kind are supplied onto a sieve located in an open container. Boiling water is introduced into the container, the brewed beverage passing through the sieve and subsequently through an uncontrolled outlet in the base of the container. Thorough mixing of the ingredients is not obtained and there is no control over the brewing period to give beverages of different strength to suit requirements.

After the beverage has been dispersed, the container is inverted to discharge the beverage residue. This has been found to be ineffective as a certain amount of residue is inevitably retained on the sieve. More sophisticated residue extractors are also designed to operate after the brewing process is completed and do not serve as aids in mixing the ingredients. These extractors are usually complicated in construction and consequently expensive to manufacture.

Hygroscopic materials such as sugar, powder coffee and the like are also difficult to dispense from their containers because the granules of such materials tend to coagulate when moisture is absorbed by them.

Presently used ingredient dispensers include a canister having a rotatable shaft therein. The shaft has a set of leaf springs projecting therefrom which are adapted to co-operate with the sides of the canister. When the shaft is rotated the leaf springs engage the materials and thereby prevent tunnelling and coagulation. However, the leaf springs allow only a unidirectional rotation of the shaft and during service and/or repair of a dispenser, the shaft is often unintentionally turned in the opposite direction thus damaging the leaf springs.

Furthermore, servicing and/or repairing of vending machines is presently done in workshops and the complete machine has to be transported to the workshop from the installation site. This is inconveniently expensive and time-consuming. Alternatively, skilled workmen and equipment have to be transported to the site where repair is necessary on major breakdowns.

It is an object of the present invention to provide a vending machine having a beverage dispenser which enables a thorough mixing of the ingredients to be obtained and thus an optimum use of these ingredients to be made.

A further object of the invention is to provide a vending machine with a residue extractor of simple construction which also serves the purpose of mixing the ingredients with liquid and thus obtaining optimum use of the ingredients.

Another object of the invention is to provide a vending machine having an ingredient dispenser with suitable and reliable means for preventing the coagulation of the ingredients in a canister.

The invention also has as an object the provision of a vending machine which will enable the service and repair thereof to be facilitated, such that it may be done by semi-skilled labor.

According to this invention there is provided a vending machine having at least one beverage dispenser comprising a container with a closed base, at least one jet located to discharge into the container to cause a circulatory movement in the container of liquid passed through the jet and a controlled outlet from the container.

Further features of the invention provide for the container to have a siphonic outlet, for the siphonic outlet as the controlled outlet to be adapted to discharge a brewed mixture into a residue extractor, for there to be a plurality of jets located at different heights in the container, at least two jets being located to cause conflicting circulatory movement in the container of liquid passed through the jets and for the container to have a heating element associated therewith.

Still further features of the invention provide for the residue extractor to comprise a rotatable screw conveyor located in close fitting relationship in a tubular body whereof a portion of the periphery is formed by a strainer, said tubular body having an inlet for the brewed mixture, an outlet for beverage through the strainer and a separate outlet for beverage residue transportable by means of the screw conveyor, for the strainer to be located substantially at the center of the length of the tubular body and for said inlet to be located in diametrically opposed relationship to the strainer.

The invention also provides for the vending machine to be provided with at least one dispenser for granular material comprising a canister having an outlet at its lower end and a rotatable shaft associated with the outlet, said shaft having helical springs projecting transversely therefrom, for each helical spring to be angularly spaced from an adjacent spring and to be spaced also along the length of the shaft and for each helical spring to have the free end thereof closed.

The invention furthermore provides for the vending machine to comprise a casing for the component parts, said component parts being assembled in modular units each of which is releasably engaged on the casing, for the units to be releasably engaged on the casing by interacting hook formations and/or by means of threaded members and for at least some of the units to have testing means associated therewith.

A preferred embodiment of the invention is described below with reference to the accompanying schematic drawings in which.

Figure 1:
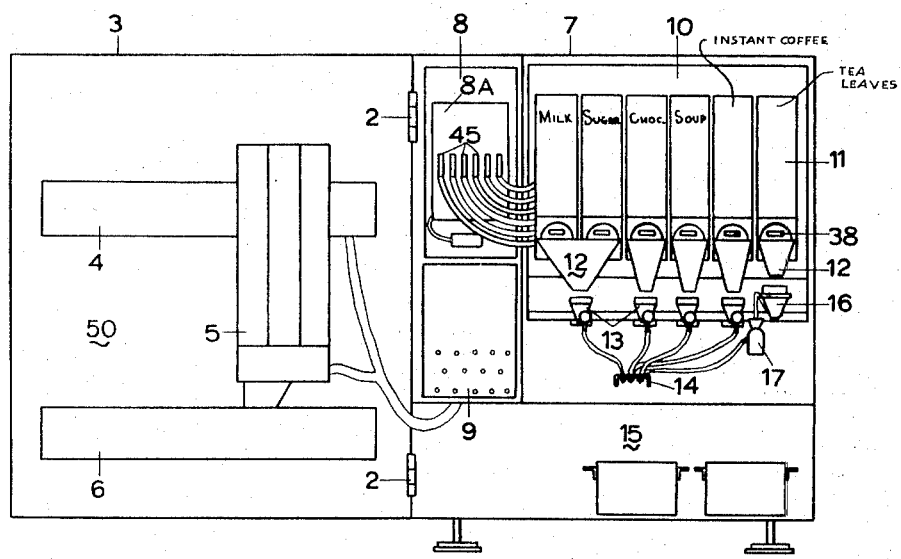
FIG. 1 is an elevation of a vending machine with its door in an open position.

Referring to FIG. 1, the casing of the vending machine is formed in two parts hinged together at 2. One part serves as a door 3 for the machine and supports a selection panel 4, a cup dropper unit 5 and a dispensing panel 6. The other part serves as the body 7 of the machine and supports a boiler unit 8, an electrical unit 9 and an ingredient dispensing unit 10.

Basically, the boiler 8A is adapted to supply hot water for use with preselected ingredients dispensed from ingredient dispensers 11. Soluble ingredients such as drinking chocolate, soup or instant coffee are directed through chutes 12 into whipper bowls 13 where they are thoroughly mixed with hot water from the boiler unit 8A. The outlet of each whipper bowl is connected by means of a pipe to a discharge unit 14 secured to the rear wall 15 of the body 7 of the vending machine. The arrangement is such that the discharge unit is located above the dispensing panel 6 when the door 3 is in a closed position. The cup dropper unit 5 is adapted to deposit individual cups below the discharge unit prior to the flow of solution.

Insoluble ingredients such as coffee grounds or tea leaves are directed through a chute 12 into a beverage dispenser 16 where the brewing process takes place. The brewed mixture is subsequently directed into a residue extractor 17 and the beverage is dispensed from there in the manner described above.

Figure 4:
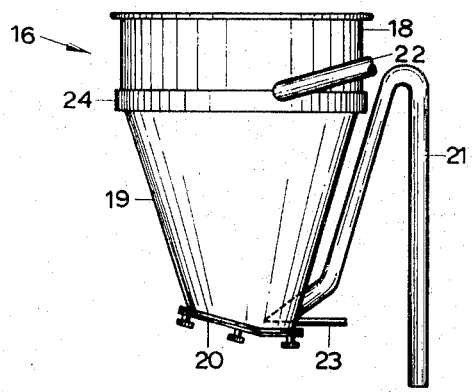
FIG. 4 is an elevation of a beverage dispenser.
Figure 5:
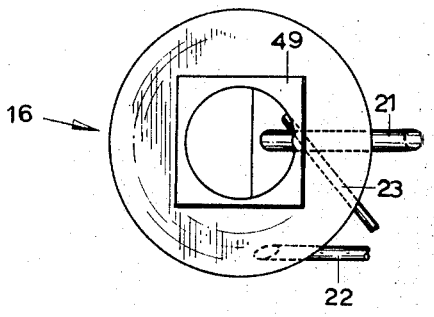
FIG. 5 is a plan view of the dispenser shown in FIG. 4.

As shown in FIGS. 4 and 5, the beverage dispenser 16 comprises a container having an upper cylindrical portion 18 and a lower conical portion 19 terminating in a closed base 20. The container is provided with a controlled outlet which in this embodiment of the invention is a siphonic outlet 21. The latter extends from the base of the container and passes through the wall of said conical portion 19. As shown in FIG. 5, the top of the container is provided with an opening 49 adapted to be closed by a solenoid operated slide (not shown) or the like.

An upper inlet jet 22 is located to discharge substantially tangentially into the cylindrical portion 18 of the container and a second, preferably smaller jet 23 is arranged to discharge in similar manner but in the opposite direction in the lower part of the conical portion 19. This results in a turbulent and swirling action of boiling water introduced into the container through the jets.

The base 20 of the container can be made removable if required and is preferably sloped towards the siphonic outlet 21. A heating element 24 is provided around the container and is situated slightly below the top of the siphonic outlet 21. The heating element serves the purpose of maintaining the contents at a required temperature and of generating a quantity of steam as described below.

In use a coin is inserted in the machine which results in a predetermined quantity of tea leaves or coffee grounds being deposited in the container through the opening 49. Immediately after this the opening is closed by the solenoid operated slide and the necessary volume of boiling water is injected into the container. The swirling action of the water results in optimum contact between the leaves or grounds to give a beverage which has made maximum use of the leaves or grounds. As soon as the level of the mixture in the container reaches the heating element 24 a quantity of steam is generated. As the steam cannot escape from the container, there is no heat loss and the slight pressure rise inside the container is considered to be advantageous to the brewing process.

Not all the water required to fill the cup with beverage is initially discharged into the container and thus the level is kept below the top of the siphonic outlet. This enables a brewing period to be established and thereafter a further quantity of water is introduced into the container to result in a siphonic discharge of all the contents into the residue extractor 17.

Different delay periods can be automatically provided to give beverages of different strengths to suit requirements.

Under some circumstances it may be desirable to replace the siphonic outlet with either a pump or a suitable valve in the base of the container through which the brewed mixture can be discharged.

Figure 6:
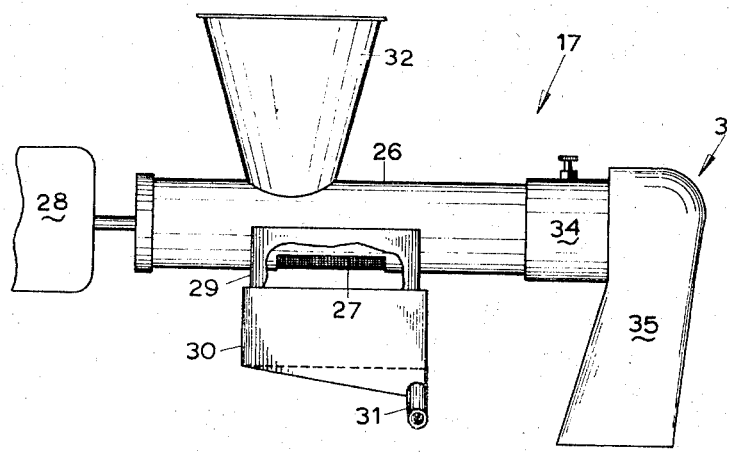
FIG. 6 is a part-fractioned elevation of a residue extractor.
Figure 7:
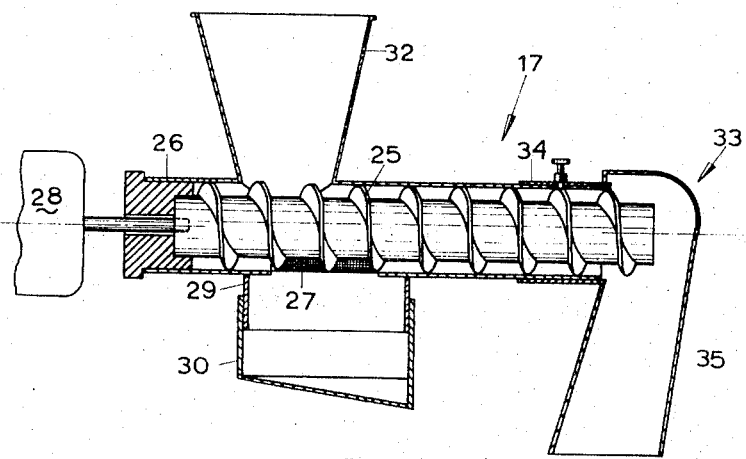
FIG. 7 is a cross-sectional elevation of the extractor shown in FIG. 6.

Referring to FIGS. 6 and 7, the residue extractor 17 comprises a screw conveyor 25 of suitable material located in close fitting relationship in a metal or plastic tubular body 26 whereof a portion of the periphery is formed by a strainer 27. The tubular body 26 is horizontally disposed in an operative position of the extractor. The screw conveyor extends substantially the length of the tubular body 26 and is coupled to an electric motor 28. The strainer is located substantially at the center of the length of the tubular body and is enclosed by an open ended, cross-sectionally rectangular duct 29 soldered to the tube. A second duct 30, closed at its base, is slidably fitted over the duct 29. The base of the duct 30 is sloped in two planes towards one corner thereof, where it is provided with an outlet pipe 31. Thus the ducts 29 and 30 provide an outlet from the tubular body 26 through the strainer 27.

An inlet cone 32 is soldered onto the tubular body 26 in diametrically opposed relationship to the strainer 27. The inlet cone is preferably located opposite the end of the strainer closest to the electric motor 28, as is illustrated in FIG. 7. A conduit 33 is slidably fitted to the end of the tubular body 26 remote from the electric motor 28 and forms the residue outlet from the extractor. The conduit comprises a short tubular portion 34 which is fitted over the tubular body and a transverse portion 35.

In use, the brewed mixture discharged through the siphonic outlet of the beverage dispenser 16 is directed into the inlet cone of the extractor. The electric motor 28 is associated with the dispenser timing apparatus such that the motor is automatically switched on when the brewed mixture starts siphoning from the dispenser and is switched off after a predetermined length of time. The rotation of the screw conveyor imparts turbulence to the brewed mixture when the latter passes over it and in this way serves as an aid in mixing the ingredients and thus obtaining optimum use of the ingredients. The residue, which may be tea leaves or coffee grounds, is forced along the tubular body to the outlet conduit 33 as a result of the rotation of the screw conveyor and the beverage passes through the strainer 27 to the outlet pipe 31, whence it is dispensed as described above.

It will be appreciated that there is a certain time delay involved in passing the brewed mixture through the extractor and that this time delay is usefully utilized in making maximum use of the tea leaves or coffee grounds.

It is considered that the screw conveyor may be designed to compress the residue while the latter is transported towards the outlet so that most of the beverage is extracted from the brewed mixture.

Figure 8:
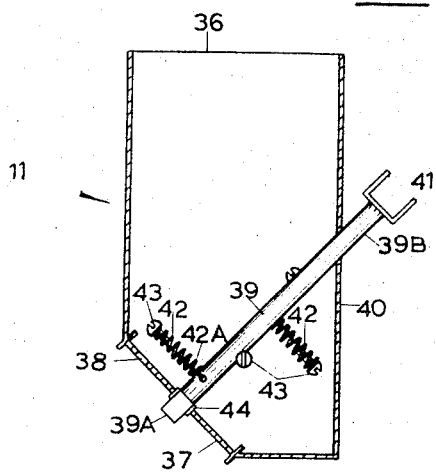
FIG. 8 is a cross-sectional elevation of an ingredient dispenser with means for preventing coagulation of material therein.
Figure 9:
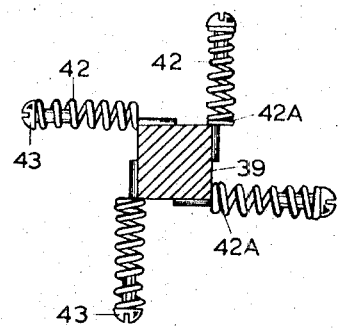
FIG. 9 is a cross-sectional end elevation of said means in FIG. 8.

Referring to FIGS. 8 and 9, each ingredient dispenser 11 comprises a canister 36 for storing ingredients such as suger, powdered milk, tea leaves or the like.

The lower end of the canister 36 has an inclined portion 37 adapted to receive thereon dispensing means (not shown) commonly known in the art. Said means usually comprises a rotatable disc having a plurality of perforations therein. The outlet 38 of the canister consists of a perforation adjacent the upper end of this portion 37. Projecting at right angles to said portion 37 and centrally supported on suitable bushes 44 is a square sectioned shaft 39 extending into the canister 36 from the inclined portion 37 and outwardly through the opposite wall 40 as shown in FIG. 8.

The end 39A of the shaft at the inclined portion is adapted to engage the dispensing means and rotate it, whereas the opposite end 39B has a coupling 41 for engagement with a motor, as is usual in such dispensers.

Connected to the shaft 39 on the length thereof within the canister 36 is a set of transversely projecting helical springs 42. Each of these springs 42 is angularly spaced from the adjacent spring and is also spaced along the length of the shaft 39 such that the set of springs follow a spiral pattern.

One end 42A of each spring 42 is secured to a side of the shaft 39. The free end of each spring 42 is provided with a screw 43, the thread of which is engaged with the inner helix of the spring. A weight is therefore provided at the free end to afford a hammering action and simultaneously the free end of the spring is blocked, thus preventing the ingress of the ingredients.

It was found that such an arrangement works effectively even though the lengths of the springs 42 is such that they will not interact with the walls of the canister 1. However, it is preferable for the springs to be of sufficient length such that they will be swung backwards by contact with the walls and suddenly released when the shaft is rotated, thereby providing a hammering action on the ingredients.

In use, the shaft is rotated through the coupling 41 so that the dispensing means will be rotated simultaneously with the springs.

It will be appreciated that such a spring system is effective to prevent coagulation of the ingredients and may be turned in either direction without causing damage to the components. The vibration and hammering action will prevent a tunnelling effect occuring in the material being dispensed.

In this embodiment of the invention the vending machine has its component parts arranged to facilitate maintenance and/or repair thereof.

The component parts of the vending machine are grouped into modules allowing for the expedient removal and replacement of any module. The wires from each module are collected into one or more harnesses to facilitate connection and disconnection.

Figure 2:
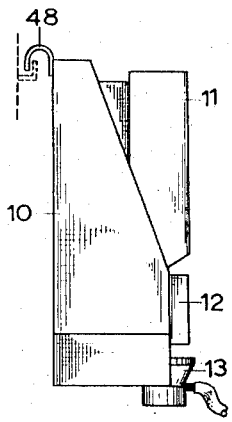
FIGS. 2 and 3 are side elevations of separate modular units of the vending machine.
Figure 3:
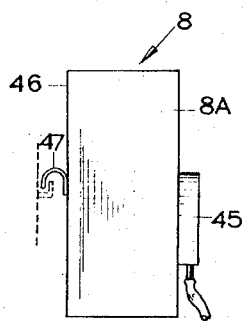

Referring to FIGS. 1, 2 and 3, the boiler 8A and accessories such as solenoid valves 45, wires, outlets and insulation are grouped and connected to form one boiler unit 8. The rear 46 of the boiler unit 8 is provided with a horizontally extending hook formation 47 adapted to engage a mating formation projecting from the inner face of the casing. The boiler unit may therefore be clipped onto the casing.

An ingredient dispensing unit 10 is formed by the canisters 36 and their accessories such as chutes 12 and whipper bowls 13. This modular unit 10 is also conveniently located on the casing by a hook formation 48.

An electrical box 9 for the timer arrangements, switch gear and controls, forms the third unit located on the rear wall 15 of the body 7 of the vending machine. These units 9 and 10 are preferably located by hook formations but it will be understood that three or four self-tapping screws, for example, may be used to the same end.

The front wall 50 of the door 3 of the vending machine is provided with a dispensing panel 6, a selection panel 4 and a cup dropper unit 5. The selection panel 4 includes a row or rows of buttons with their respective switches. The conducting wires are collected into a harness and the whole arrangement may be removed as a unit.

The vending machine is, in this case, divided into six removable modular units, namely, boiler unit 8, ingredient dispensing unit 10, electrical unit 9, dispensing panel 6, selection panel 4 and cup dropper unit 5. Any of these may be removed and replaced with ease.

Associated with the electrical unit is also a set of test switches and indicators to detect defects and/or absence of sufficient water, ingredients or cups.

It will be appreciated that should some unit malfunction, it is merely replaced with another unit. The first unit is then transported to the workshop for repair. Time delays and transport inconvenience are therefore minimised. The simplicity of replacing modules therefore affords the use of semi-skilled labor. Cost of repair and maintenance will therefore decrease.

Generally each unit is removed by disconnecting the harness and tubes where applicable, and disengaging the unit from the casing. The reverse operation is used for installation of the unit.

It will then be appreciated that such a system affords an expedient and simple way of repairing vending machines and at least minimizes the previous inconvenience. It further reduces costs of repair and maintenance due to the employment of semi-skilled labour for such work.

Instead of locating the units directly onto the casing, they may be secured to a chassis which may also be removably located within the casing. This was found particularly suitable for supporting the units against the rear wall 15 of the body 7 of the vending machine.

What I claim as new and desire to secure by Letters Patent is:

1. A device for dispensing an individually brewed cup of beverage comprising:
   a. a container having a top and a closed base;
   b. means for adding at least one beverage ingredient to the container;
   c. at least one jet positioned to discharge a liquid into the container to cause a circulatory movement of the liquid in the container;
   d. a siphonic outlet from the container having an ascending portion with its inlet within the container adjacent the closed base, a descending portion with its outlet below the closed base and an uppermost portion below the top of the container so that when the liquid rises in the ascending portion and reaches said uppermost portion, the siphon will automatically substantially empty the dispenser.

2. The device of claim 1 in which a plurality of jets are provided to discharge at different heights into the container, at least two jets being located to cause conflicting circulatory movement in the container of liquid passed through the jets.

3. The device of claim 1 in which the container has a heating element associated therewith.

4. The device of claim 1 in which means are provided for closing off the top of the container.

5. The device of claim 1 in which the outlet of the beverage dispenser is adapted to discharge a brewed mixture into a residue extractor comprising a rotatable screw conveyor located in close fitting relationship in a tubular body whereof a portion of the periphery is formed by a strainer, said tubular body having an inlet for the brewed mixture, an outlet for beverage through the strainer and a separate outlet for beverage residue transportable by means of the screw conveyor.

6. The device of claim 5 in which the strainer is located substantially at the center of the length of the tubular body, the inlet being located in diametrically opposed relationship to the strainer.

7. The device of claim 1 including at least one dispenser for granular material comprising a canister having an outlet at its lower end positioned to discharge the granular material into said container, a rotatable shaft directed toward the outlet, said shaft having helical springs projecting transversely therefrom to agitate the granular material toward the outlet when the shaft is rotated.

8. The device of claim 7 in which the helical springs are spaced along the length of the shaft, each spring being angularly spaced from an adjacent spring and having the free end thereof closed.

* * * * *